United States Patent [19]
Kotzin et al.

[11] Patent Number: 5,894,498
[45] Date of Patent: Apr. 13, 1999

[54] METHOD AND APPARATUS FOR ANALYZING A COMPOSITE CARRIER SIGNAL

[75] Inventors: Michael D. Kotzin, Buffalo Grove; Joseph Schuler, Roselle, both of Ill.

[73] Assignee: Motorola, Inc., Schaumburg, Ill.

[21] Appl. No.: 08/805,818

[22] Filed: Feb. 26, 1997

[51] Int. Cl.⁶ .................. H04L 27/04; H04L 27/12; H04L 27/20
[52] U.S. Cl. .................. 375/295; 375/260; 375/242
[58] Field of Search .................. 375/295, 240, 375/260, 242, 377; 341/180

[56] References Cited

U.S. PATENT DOCUMENTS

| | | | |
|---|---|---|---|
| 4,890,283 | 12/1989 | Tsinberg et al. | 370/112 |
| 5,134,464 | 7/1992 | Basile et al. | 358/12 |
| 5,201,071 | 4/1993 | Webb | 455/101 |
| 5,243,629 | 9/1993 | Wei | 375/260 |
| 5,315,583 | 5/1994 | Murphy et al. | 375/295 |

FOREIGN PATENT DOCUMENTS

WO96/13918   5/1996   WIPO.

OTHER PUBLICATIONS

"Minimisation of the Peak to Mean Envelope Power Ratio of Multicarrier Transmission Schemes by Block Coding", Wilkinson and Jones, pp. 825–829.

Primary Examiner—Chi H. Pham
Assistant Examiner—Emmanuel Bayard
Attorney, Agent, or Firm—Sayed Hossain Beladi

[57] ABSTRACT

A communication system receives and codes a plurality of information signals according to coding assignments to produce a plurality of coded baseband signals. From these signals, a simulated composite carrier signal is formed which has all the characteristics of an actual composite carrier signal which would have resulted if the plurality of coded baseband signals had been formed. The simulated composite carrier signal is analyzed to determine its peak-to-average ratio. The communication system selects a different coding assignments for coding the plurality of information signals if, based on the determined peak-to-average ratio and a selection criteria, the coding assignment does not produce the desired results. The communication system selects a different coding assignments until at least one or several desired coding techniques have been identified, ranks the coding techniques and makes a final selection of the coding technique to meet the peak-to-average ratio requirements.

18 Claims, 5 Drawing Sheets

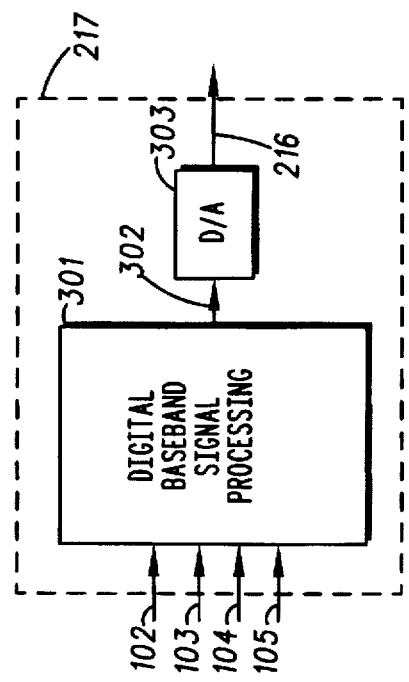
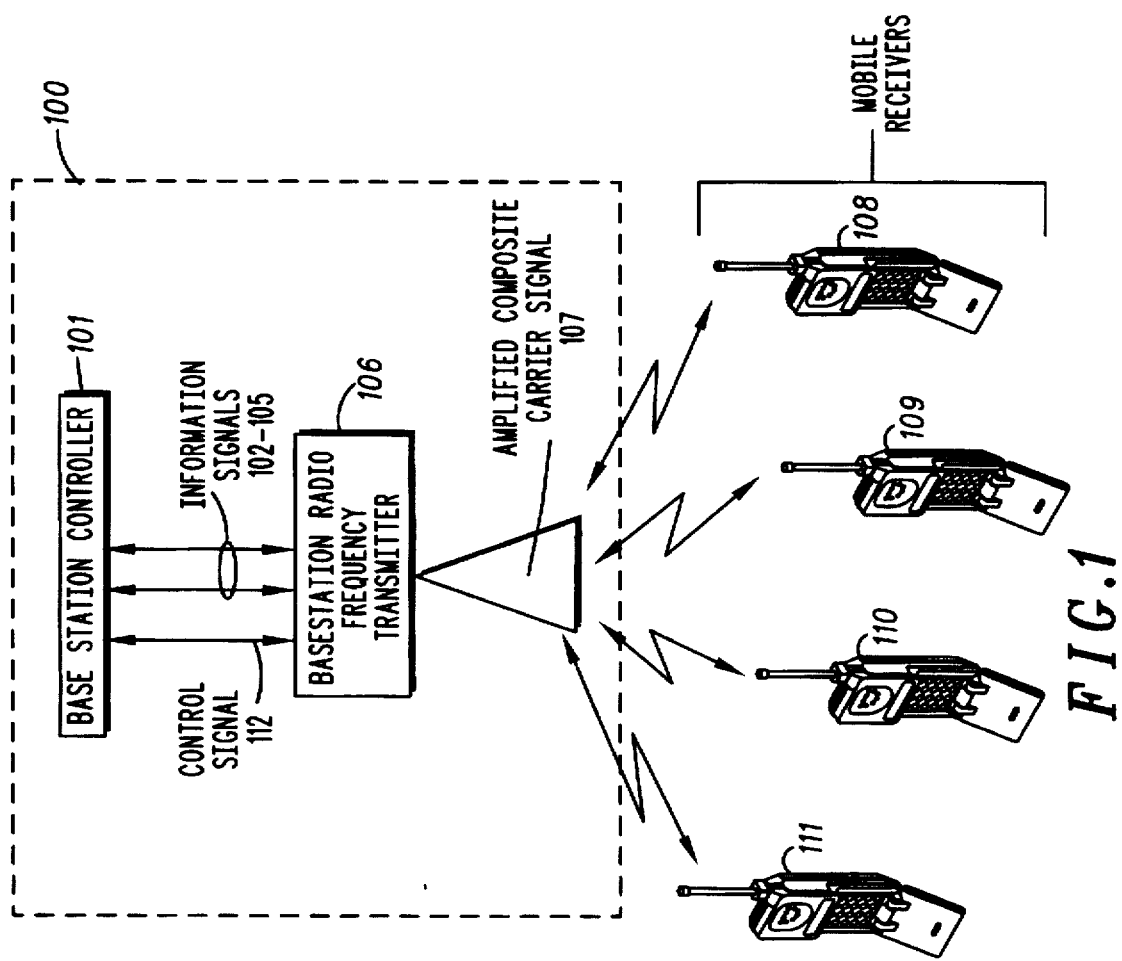

METHOD AND APPARATUS FOR ANALYZING A COMPOSITE CARRIER SIGNAL

FIELD OF THE INVENTION

The present invention generally relates to telecommunication devices, and particularly, to transmitters embodied in the telecommunication devices.

BACKGROUND OF THE INVENTION

In modern digital and analog cellular telecommunication systems, a cellular base station communicates with multiple mobile units while maintaining exclusive communication links with the mobile units. A base station may transmit a carrier signal that is a composite of all the exclusive carrier signals. Each receiving unit receives the composite carrier signal and extracts a desired information from the composite carrier signal. The composite carrier signal is the combined carrier signals that are transmitted on different carrier frequencies, or common carrier frequency. The composite carrier signal is amplified through a linear power amplifier that has a finite peak power capacity. The linear power amplifier should be operated in its linear region as such to prevent the composite carrier signal distortion, which also creates undesired spurious radiation. Therefore, the highest possible peak of the amplified composite carrier signal amplitude should be below the peak power capacity of the transmitter linear power amplifier.

In systems where the amplified carrier signal is a composite of multiple carrier signals, the highest possible peak amplitude, also defined as peak power, of the composite carrier signal may be substantially large. The peak power of a composite carrier signal increases as a square function of the number of carrier signals combined thereof. For example, the peak power of a composite carrier signal is approximately one hundred times larger than the average power of the individual carrier signals when a base station transmitter is transmitting a composite carrier signal comprising of ten carrier signals. In such a system, the linear power amplifier should have an arduous linear operating region, that places extreme burden on designing and keeping the linear power amplifier within its operating requirements. As a result, the cost and efficiency of the linear power amplifiers, in such a system, are substantially increased.

A clipping technique is a commonly used method for relaxing power amplifier operating requirements. In this method, if the composite carrier signal peak amplitude is above certain level, the signal would be clipped prior to being input to the power amplifier. However, a significant signal degradation often results from the clipping technique.

In another technique for controlling the peak power level of a composite carrier signal, a scheme of block coding is utilized. In the block coding scheme, each carrier signal of the composite carrier signal is coded with a code; as a result, the peak power level of the composite carrier signal may be changed to a level that the resulting amplified composite carrier signal would not be distorted. In this method, the codes are predetermined and trivially selected before any knowledge of the content of information signals; such that, it is possible to have the amplified composite carrier signal distorted at a level far above any acceptable level. The implementation of block coding scheme has been impeded due to the unpredictable results, because the codes are perfunctorily selected for each carrier signal.

Thus, a need exists for an improved method and apparatus for analyzing a composite signal to effectively reduce the peak to average amplitude ratio of a transmitted composite carrier signal.

BRIEF DESCRIPTION OF THE DRAWINGS

The features of the present invention are set forth with particularity in the appended claims. The invention may best be understood by making references to the following drawings, in the several figures of which like reference numerals identify identical elements, and wherein:

FIG. 1 generally depicts a block diagram and signaling hierarchy of a cellular communication system;

FIG. 3 generally depicts a block diagram of an embodiment of a composite carrier generator that includes a digital composite carrier signal;

DETAILED DESCRIPTION OF A PREFERRED EMBODIMENT

Figure 2:
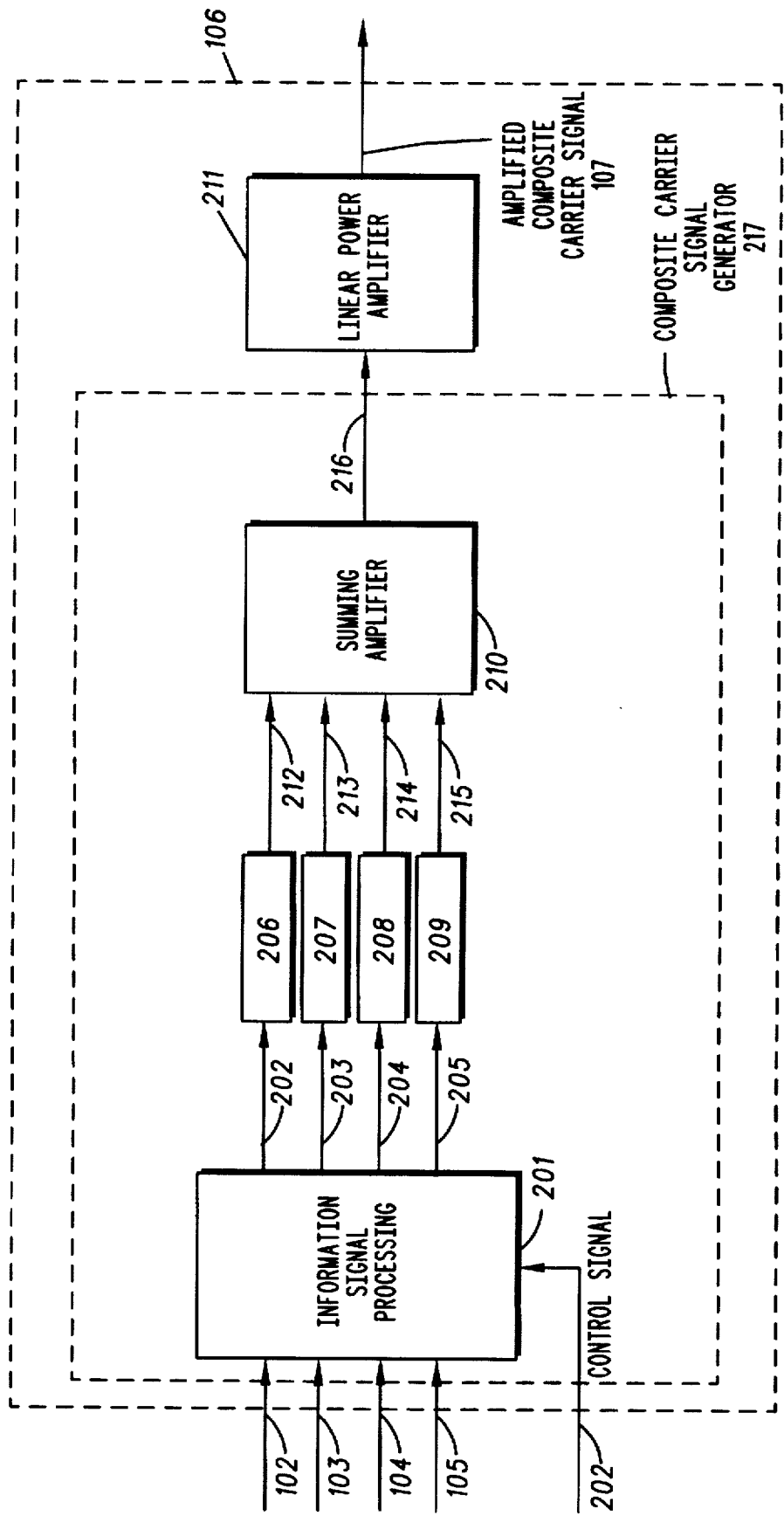
FIG. 2 generally depicts a block diagram of a radio frequency transmitter which analyzes a composite signal in accordance with the invention.

A communication system receives and codes a plurality of information signals according to coding assignments to produce a plurality of coded baseband signals. From these signals, a simulated composite carrier signal is formed which has all the characteristics of an actual composite carrier signal which would have resulted if the plurality of coded baseband signals had been formed. The simulated composite carrier signal is analyzed to determine its peak-to-average ratio. The communication system selects a different coding assignments for coding the plurality of information signals if, based on the determined peak-to-average ratio and a selection criteria, the coding assignment does not produce the desired results. The communication system selects a different coding assignments until at least one or several desired coding techniques have been identified, ranks the coding techniques and makes a final selection of the coding technique to meet the peak-to-average ratio requirements.

The communication system for transmitting the composite carrier signal comprises a coder for coding a plurality of information signals according to a coding technique to produce a corresponding plurality of coded baseband signals, and a processor for processing the plurality of coded baseband signals to form a simulated composite carrier signal. The processor analyzes the simulated composite carrier signal based on peak-to-average amplitude ratio requirements.

In the preferred embodiment, the simulated composite carrier signal has characteristics of an actual composite carrier signal that would have resulted if the plurality of coded baseband signals had been combined. The processor produces a coding technique assignment control signal to vary and select the coding technique in the coder and produces a pass indicator based on the analysis of the simulated composite carrier signal which indicates when the simulated composite carrier signal peak-to-average amplitude ratio is within a predetermined limit.

The communication system further comprises a transmission buffer for conditioning the plurality of coded baseband signals based on the pass indicator to produce corresponding processed baseband signals which are combined to form an actual composite carrier signal having a peak-to-average amplitude ratio within the predetermined level. The conditioning includes adding information to the plurality of coded baseband signals to facilitate reconstruction of the information signals in a receiver receiving the actual composite carrier signal.

The processor repeatedly varies and selects, through the coding technique assignment control signal, coding techniques in the coder until at least one coding technique is identified for producing an acceptable set of the coded baseband signals. The selection is based on whether the peak-to-average amplitude ratio of the simulated composite carrier signal is within the predetermined limit. The processor identifies a plurality of the coding techniques for producing a corresponding plurality of the acceptable sets of the coded baseband signals and selects one of the identified coding techniques for producing the corresponding the acceptable set of coded baseband signals.

The identified plurality of coding techniques are ranked according to their contributory distortion to the information signals, and the processor selects one of the ranked coding techniques. The contributory distortion to the information signals is determined based on either equal, unequal weighting factors, no weighting factor, or a combination thereof, given to a set of the information signals.

The coder includes a speech coder for speech coding the plurality of information signals according to a speech coding assignment based on the coding technique assignment control signal to produce corresponding plurality of speech coded baseband signals. The coder also comprises a channel coder for coding the plurality of speech coded baseband signals according to a channel coding assignment based on the coding technique assignment control signal to produce the plurality of coded baseband signals.

Stated differently, the communication system for transmitting a composite carrier signal comprises a speech coder for coding a plurality of speech signals according to a speech coding assignment to produce a corresponding speech coded baseband signals and a speech decoder for decoding the speech coded baseband signals according to a speech decoding assignment to produce a corresponding transformed baseband signals. The communication further comprises a processor for processing the plurality of transformed baseband signals to form a simulated composite carrier signal and for analyzing the simulated composite carrier signal based on peak-to-average amplitude ratio requirements.

The processor repeatedly varies and selects, through either speech coding, speech decoding, or the assignment control signals, different speech coding or decoding, assignments in the speech coder and/or decoder, until at least a speech coding, decoding, or a pair of coding and decoding assignments are identified for producing an acceptable set of the transformed baseband signals based on whether the peak-to-average amplitude ratio of the simulated composite carrier signal is within the predetermined limit. The processor identifies a plurality of either speech coding, decoding, or pairs of coding and decoding assignments for producing corresponding plurality of the acceptable sets of the transformed baseband signals and selects either one of the identified speech coding, or decoding, or pairs of coding and decoding, assignments for producing the corresponding the acceptable set of transformed baseband signals. The identified plurality of speech coding, or decoding, or pairs of coding and decoding, assignments are ranked according to their contributory distortion to the speech signals and the processor selects one of the ranked speech coding assignments. The contributory distortion to the information signals is determined based on either equal, unequal weighting factors, no weighting factors, or combination thereof given to a set of the speech signals.

The communication system also includes method of analyzing a composite signal to be transmitted which comprises the steps of simulating a modulation of a plurality of separate signals with codes to produce a plurality of separate simulated signals which comprise the composite signal and then combining the plurality of separate simulated signals to produce the composite signal. At this point, the communication system analyzes the composite signal based on predetermined criteria related to a peak-to-average ratio of the composite signal.

The communication system also includes a method of analyzing a signal to be transmitted which includes the steps of simulating a modulation of a plurality of separate signals with modulation codes to produce a plurality of separate simulated signals and analyzing the plurality of separate simulated signals based on predetermined criteria related to a peak-to-average ratio of a composite signal comprised of a combination of the separate simulated signals.

In this embodiment, the step of analyzing the composite signal includes the step of analyzing a combination of the separate simulated signals based on the predetermined criteria related to a peak-to-average of the composite signal. When the composite signal comprised of a combination of the separate simulated signals is greater than a predetermined peak-to-average ratio threshold, modulation codes are varied. When the composite signal comprised of a combination of the separate simulated signals is less than a predetermined peak-to-average ratio threshold, the prior modulation codes are implemented. Furthermore, the method of modulating the plurality of separate signals with the modulation codes to produce a plurality of separate modulated signals further comprises the steps of combining the separate modulated signals to form an actual composite signal and transmitting the actual composite signal within a required peak-to-average ratio to a corresponding plurality of mobile stations within the communication system.

Referring now to FIG. 1, there is depicted a block diagram and signaling hierarchy of a cellular communication system employing a linear power amplifier. The system 100 includes a base station controller that transmits a plurality of information signals 102–105. Each information signal represents an independent channel of information, or, where information of one channel is divided into independent sub-channels of information, each of the information signals represents one independent sub-channel of information. A base station radio frequency transmitter subsystem 106 receives the information signals 102–105, and transmits an amplified composite carrier signal 107 which generally is comprised of coded and modulated information signals 102–105. A plurality of mobile receivers 108–111 receive the composite carrier signal 107, and each receiver 108–111 decodes and demodulates the composite carrier signal 107 as required for maintaining a communication link with the system 100 as is well known in the art. A base station controller 101 and the radio frequency transmitter 106 communicate with each other any control information through a control signal 112.

FIG. 2 generally depicts a block diagram of a radio frequency transmitter subsystem 106. The subsystem 106 selects and generates a composite carrier signal in accordance with the invention. The selection of the generated composite carrier signal is based on the analysis performed on several possible composite carrier signals. The subsystem 106 amplifies the generated composite carrier signal. The block 106 includes a composite carrier generator 217, and a linear power amplifier 211. The composite carrier signal generator 217 generates a composite carrier signal 216 in accordance with the invention.

The composite carrier generator 217 comprises an information signal processing block 201, a plurality of carrier frequency translator and modulators 206–209 and a summing amplifier block 210. The information signals 102–105 are input to the composite carrier generator 217. In the block 217, the information signal processing block 201 receives the information signals 102–105. The block 201 processes the information signals 102–105, and outputs a corresponding plurality of processed base band signals 202–205. Each of the signals 202–205 are inputs to the corresponding plurality of carrier frequency translators and modulators 206–209; thus, the processed base band signals 202–205 are translated to a corresponding plurality of carrier signals 212–215 suitable for radio frequency transmission. The carrier signals 212–215 are summed together in the summing amplifier 210 to produce a composite carrier signal 216. As it can be seen in FIG. 2, the composite carrier signal 216 is the output of the composite carrier signal generator 217. The composite carrier signal 216 is input to the linear power amplifier 211, and the output of the linear power amplifier 211 is the amplified composite carrier signal 107.

The information signal processing block 201 of FIG. 2 processes the information signals 102–105 based on a deterministic analysis of peak to average amplitude ratio of the composite carrier signal 216. The block 201 analyzes and processes the signals 102–105; and it produces corresponding processed base band signals 202–205, such that, the resulting composite carrier signal 216 peak to average amplitude ratio is below a targeted level. One of ordinary skill in the art may appreciate that the target level is selected such that, when the signal 216 is amplified to the signal 107 through the linear power amplifier 211, the distortion of signal 107 is maintained below a desired level.

The processing operation on the information signals 102–105 may also be based on deterministically analyzing criterion other than the peak to average amplitude ratio of the signal 216. The other criterion is a peak amplitude of the signal 216; in this case, the processing operations are executed such that the peak amplitude of the signal 216 is at a level that would minimize distortion in the signal 107. Another criteria of the processing operation is the number of occurrence of a peak amplitude in the signal 216; in this case, the processing operation is executed such that the signal 216 has fewer than a finite number of peaks which exceed a predetermined level during a finite period to limit an amount of distortion on the signal 107. Notwithstanding, the processing operation of block 201 of FIG. 2 is executed based on a combination of criteria, such as peak to average amplitude ratio of the signal 216, peak amplitude of the signal 216, and a number of peaks above a level during a finite length of time of the signal 216. If a combination of criteria is used for the processing operation of block 201 of FIG. 2, the processing operation should satisfy the condition of all criterion.

Figure 4:
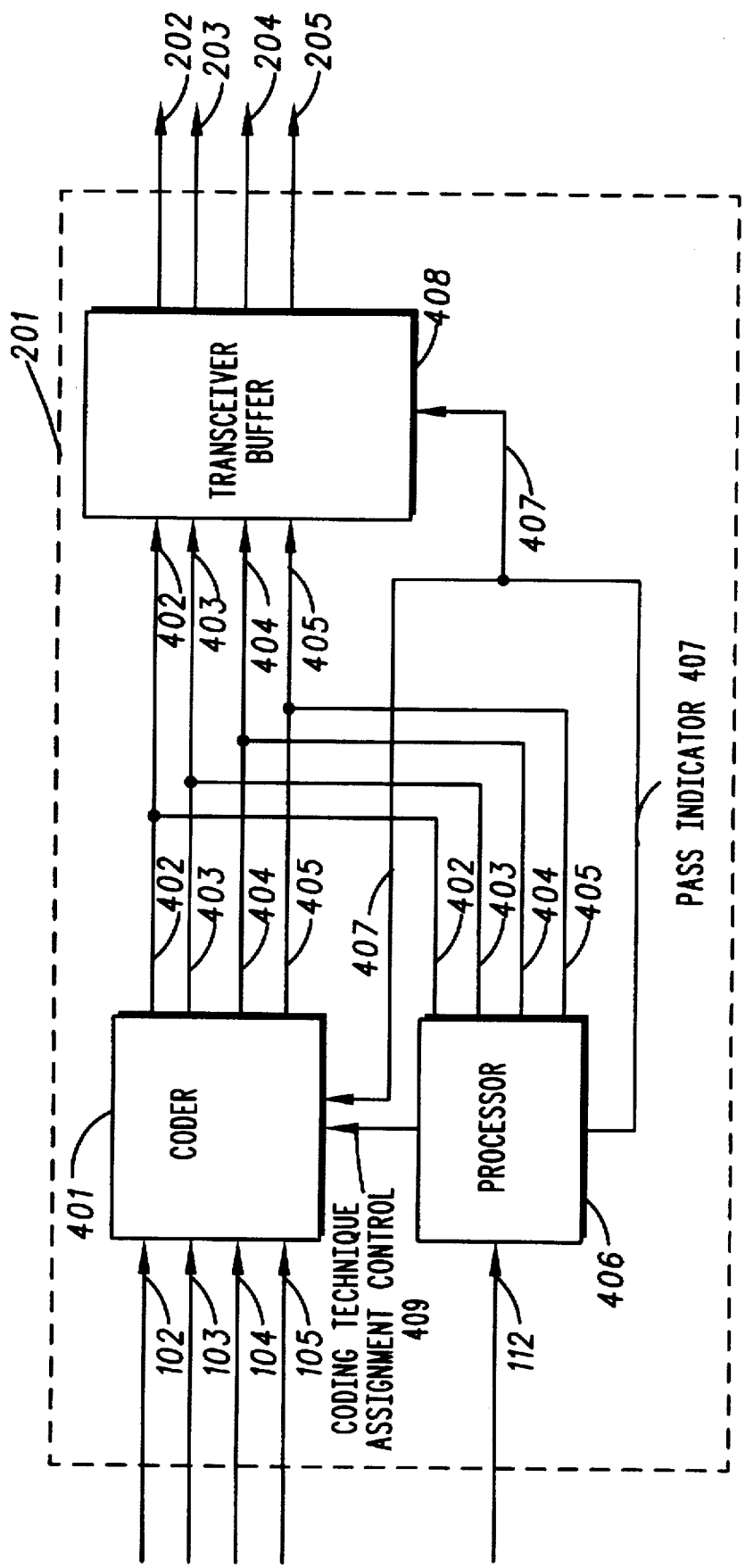
FIG. 4 generally depicts a block diagram of a signal processing block in accordance with the invention.

FIG. 4 generally depicts a block diagram of an information signal processing block 201 in accordance with the invention. The block 201 in FIG. 4 includes a coder block 401, an analyzing processor 406, and a transmission buffer 408.

In FIG. 4, the coder 401, for its interworking requirements, transforms the input information signals 102–105 to a suitable format. Furthermore, the coder 401 codes the input information signals 102–105, and produces the corresponding coded base band signals 402–405 according to a prescribed coding technique. The prescribed coding technique is selected from a plurality of coding techniques, such as convolutional coding, available in the coder 401.

In FIG. 4, the analyzing processor 406 receives the coded signals 402–405, and determines whether the resulting composite carrier signal 216 of FIG. 2 would pass the selected criteria, or criterion, by analyzing the combination of the coded signals 402–405. The composite carrier signal 216 is eventually produced from the coded signals 402–405. The analyzing processor 406 takes also into consideration, for analyzing the coded signals 402–405, the effects of the system components on the coded signals 402–405 for the eventual production of the composite carrier signal 216. These effects, whether pre-programmed or updated by the base station controller 101 of FIG. 1, are attributed to the operations of the transmission buffer block 408 of FIG. 4, the frequency translation and modulation of blocks 206–209 of FIG. 2, and the summing amplifier block 210 of FIG. 2. In addition, the analyzing processor 406 takes into consideration the limitations of the power amplifier 211 of FIG. 2 for analyzing the coded base band signals 402–405. These limitations of the power amplifier 211 of FIG. 2 are pre-programmed or updated by the base station controller 101 of FIG. 1. The effects of the system components and the limitation of the power amplifier are provided by the base station controller, through control signal 112 that is connecting the controller 101 in FIG. 1 with the analyzing processor 406 of FIG. 4.

The coder 401 of FIG. 4 has an input coding technique assignment control signal 409 which is generated by the analyzing processor 406. The analyzing processor 406 indicates to the coder 401, through the coding technique assignment control signal 409, that assigning a coding technique is needed.

Normally, a new coding technique is needed when the analyzing processor determines that coded signals 402–405 would not eventually produce the composite carrier signal 216 that passes the selected criteria, or criterion.

In another scenario, the analyzing processor 406 requests a new coding technique through signal 409, although it has identified that coded signals 402–405 would eventually produce the composite carrier signal 216 that passes the selected criteria, or criterion. In this situation, the analyzing processor 406 is signaling the coder 401 for selecting another coding technique in compiling several sets of candidates of the coded signals 402–405 that all would eventually produce the composite carrier signal 216 that passes the selected criteria, or criterion. In this case, after several sets of candidates of the coded signals 402–405 have been compiled, the analyzing processor 406 determines which set of candidates should be selected for eventual forming of the composite carrier signal 216. The determination of which candidate is the selected candidate is based on a certain ranking of each set of candidate coded signals. The ranking is based on a weighting factor assigned to each signal or a signal quality measurement when the signal is decoded by a mobile receiver.

In certain cases, the selected coding technique introduces bit errors in the information signals 102–105, or reduces the information signals quality, which are eventually detected by a mobile receiver. The analyzing processor receives from the base station controller 101, through a control signal 112, the assigned weighting factors of the information signals.

The assigned weighting factors are the tolerated signal quality or acceptable number of bit errors or other appropriate error rate metric.

Each time the coding technique assignment control signal 409 is input to coder 401, the coder 401 codes the input information signals 102–105 with a different selected coding technique than the previous selection; and, it produces corresponding coded signals 402–405. The processes of selecting and coding are repeated until at least one coding technique is selected by the analyzing processor 406 for coding with the information signals 102–105. If more than one technique of coding is desired for compiling and ranking of the coded signals 402–405, the selection process is repeated. This method does not in any way preclude an implementation whereby all or a subset of possible coding options are performed simultaneously, in parallel with each other, and the results then processed by the analyzing processor 406.

The final selection of a coding technique is determined by the analyzing processor 406. If only one coding technique has been selected, the final selection is limited to that coding technique. Otherwise, the final selection is from a plurality of selected coding techniques that have been ranked according to a weighting function of each coded base band signal 402–405.

Very often the information signals 102–105 are received in a packet format. In this case, the bursts of information packets are separated in time, and arrive at different times at the coder 401. The coder 401 transforms the information packet signals 102–105 to a suitable format for the coding process. The coder 401 is informed by the coding technique assignment control 409 that a new information packet has arrived whereby the coder 401 begins the coding technique assignment and process.

In an application of this invention in real time system, the signal processing block 201 produces the processed base band signals 202–205 in the packet format. The coder 401 codes the signals 102–105, and produces coded information packet signals 402–405. The analyzing processor 406 analyzes the coded information packet signals 402–406 according to the selection criteria for determining an acceptable coding technique. The transmission buffer 408 transforms the packet signals 402–406 to the processed base band packet signals 202–205. The analysis of the coded information packet signals 402–405 is based on the composite carrier packet signal 216 that is eventually generated from the processed base band packet signals 202–205. The selected coding technique is the same or different than previously selected coding technique.

After final selection of a coding technique, the analyzing processor 406 outputs a pass indicator signal 407. The pass indicator signal 407 contains information such as: which coding technique is finally selected; system timing of each coded base band signal 402–405; and other pertinent information. The coder 401 receives the pass indicator 407, and learns which coding technique is selected from the plurality of the selected candidate coding techniques. If there was only one candidate of coding technique, the channel coder need not use the signal 407; in this case, the final selection of coding technique is known to the coder 401 from the interaction between the coder 401 and the analyzing processor 406 through the coding technique assignment control 409. Once the final selection of a coding technique is established, the coder 401 codes the information signals 102–105 with the selected coding technique, and outputs corresponding coded base band signals 402–405 to the transmission buffer 408.

The transmission buffer 408 passes the coded information signals 402–405 to its outputs as the corresponding processed base band signal 202–205. The transmission buffer 408, if it requires, adds additional information to the coded base band signals 402–405. The additional information includes the system timing information, adding information about which code and coding technique was selected, and other pertinent information. The added information, when required, are used by the mobile receivers 108–111 to decode and properly affect signal reception, demodulation and information reconstruction.

Figure 5:
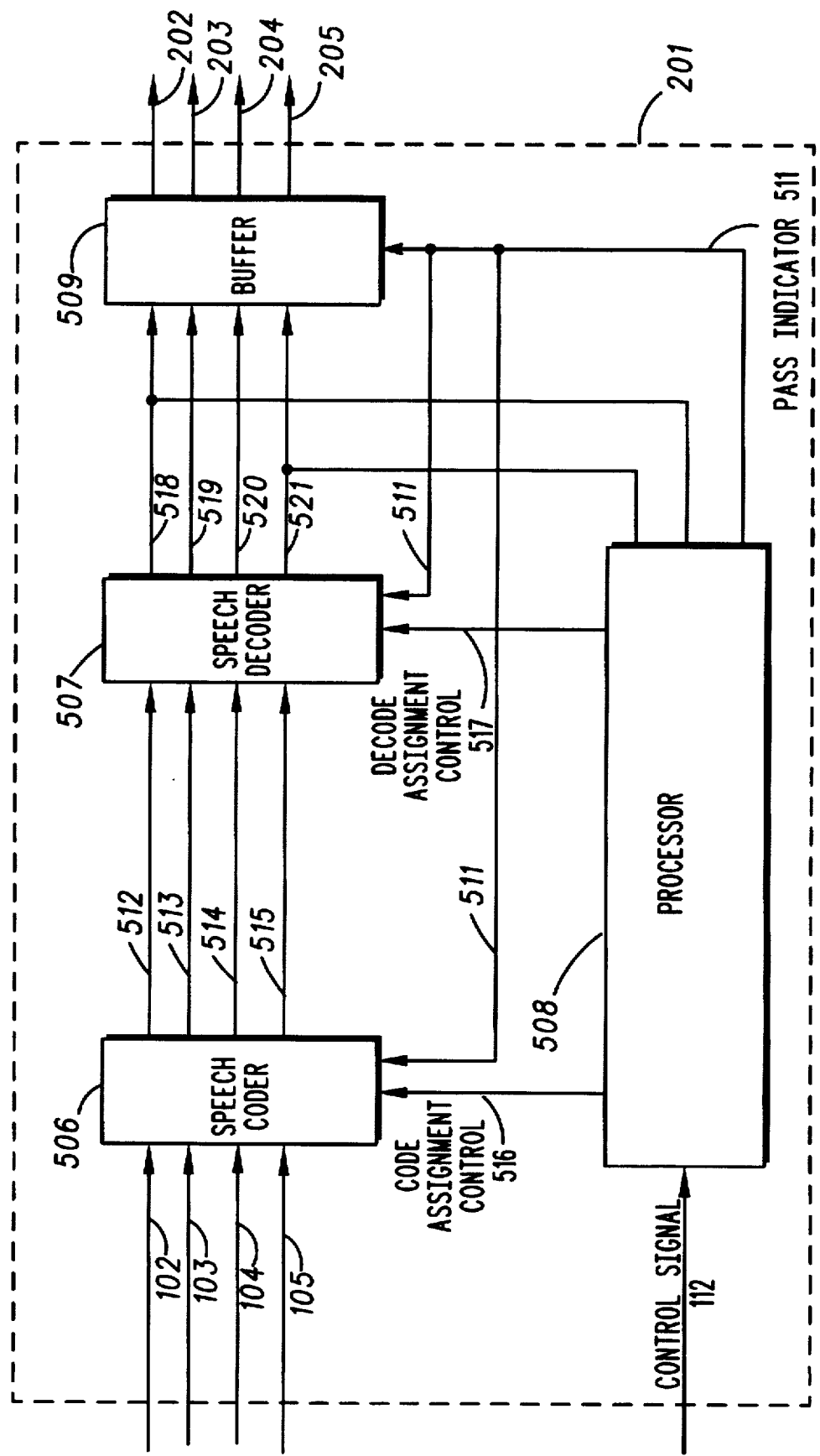
FIG. 5 generally depicts a block diagram of a signal processing block in accordance with the invention for an analog system.

FIG. 5 generally depicts a block diagram of a signal processing block of an analog communication system in accordance with the invention. The block 201 shown in FIG. 5 includes a speech coder 506, a speech decoder 507, an analyzing processor 508, and a transmission buffer 509. The speech coder 506 transforms the input signals 102–105 to a format suitable for receiving and interworking by the speech coder 506 and codes the input information signals 102–105 (which in this case are speech signals) to produce corresponding speech coded signals 512–515. The speech decoder 507 receives coded speech signals 512–515, and performs a speech decoding operation to produce corresponding transformed base band signals 518–521.

The composite carrier signal 216 in FIG. 2 is eventually produced from the transformed signals 518–521. The analyzing processor 508 receives and analyzes the transformed base band signals 518–521, and determines whether the resulting composite carrier signal 216 of FIG. 2 would pass the selected criteria, or criterion. The analyzing processor 508 takes also into consideration, for analyzing the transformed base band signals 518–521, the effect of the system components on the transformed base band signals 518–521 for the eventual production of the composite carrier signal 216 in FIG. 2. These effects, whether pre-programmed or updated by the base station controller 101 of FIG. 1, are attributed to the operation of the transmission buffer block 509, frequency translation and modulation of blocks 206–209 of FIG. 2, and operation of the summing amplifier block 210 of FIG. 2. In addition, the analyzing processor 508 takes into consideration the limitations of the power amplifier 211 of FIG. 2 for analyzing the transformed base band signals 518–521. These limitations of the power amplifier 211 of FIG. 2 are pre-programmed or updated by the base station controller 101 of FIG. 1. The effects of the system components and limitation of the power amplifier are provided by the base station controller 101 in FIG. 1, through control signal 112.

The analyzing processor 508 communicates to the speech coder 516 and speech decoder 507 through code and decode assignment control signals 516 and 517 respectively. The analyzing processor determines whether the selected speech coding and decoding operations have transformed the input signals 102–105 to corresponding transformed base band signals 518–521 such that a composite carrier signal 216 could be generated which passes the selected criteria, or criterion. Normally, new code and decode selection are needed when the analyzing processor determines that the transformed base band signals 518–521 would not eventually produce the composite carrier signal 216 in FIG. 2 that passes the selected criteria, or criterion.

In another scenario, the analyzing processor 508 requests new code and decode assignments through the code assignment control signal 516 and the decode assignment control signal 517, although it has identified a set of acceptable transformed base band signals 518–521. In this case, the analyzing processor 508 signals the coder 506 for another selection of code, or the decoder 507 for another selection of decode, or both. Subsequently, the analyzing processor 508 compiles several sets of candidates of the transformed base band signals 518–521 that each set could eventually produce the composite carrier signal 216 in FIG. 2 that passes the selected criteria, or criterion. After several sets of candidates of the transformed base band signals 518–521 have been compiled, the analyzing processor 508 determines which set from the compiled sets of candidates should be selected for eventual forming of the composite carrier signal 216 in FIG. 2. This determination of which candidate is the selected candidate is based on a certain ranking of each set of transformed base band signals candidates. The ranking is based on a weighting factor assigned to each signal or a signal quality measurement when that signal is decoded by a mobile receiver.

Every time the code assignment control signal 516 is input to the speech coder 506, the coder 506 codes the base band input signals 102–105 with a different selected set of speech codes than the previous selection for producing the coded base band signals 512–515. Similarly, every time the decode assignment control signal 517 is input to the speech decoder 507, the decoder 507 decodes the coded base band signals 512–515 with a different selected set of decodes than the previous selection for producing the transformed base band signals 518–521. This process of selection is repeated until at least one set of code is selected for coding and one set of decode is selected for decoding. If more than one set of each code and decode are desired for compiling and ranking of the selected set of codes and decodes, the selection process by the processor 508 is repeated.

The speech quality of a speech signal is affected by the coding, or decoding, or coding and decoding of that speech signal. The ranking of the compiled codes and decodes in blocks 506 and 507 are based on their effects for certain speech qualities of the speech signals. As it is known in the relevant art, the speech quality of a signal is determined by a method of perceptual speech quality estimation in the analyzing processor. The analyzing processor ranks the selected signals for the speech qualities of each signal when received by a receiver. The criteria of a speech quality threshold of each signal for the ranking process is preprogrammed or updated by the system controller, through control signal 112.

The analyzing processor 508 determines the final selection of a set of code and decode. If only one set of each code and decode have been selected, the final selection may be limited to that code and decode; otherwise, the final selection is from a plurality of selected codes and decodes that have been ranked according to a weighting function of each transformed base band signal.

After final selection of a set of codes and decodes, the analyzing processor 508 outputs a pass indicator signal 511. The pass indicator signal 511 includes information such as which set of code/decode for corresponding coding and decoding are finally selected, the system timing of the transformed signals 518–521 and other pertinent information. The coder 506 and decoder 507 receive the pass indicator 511 for learning which set of codes and decodes are selected for coding and decoding from the plurality of the selected code and decode candidates. If there was only one candidate set of code and decode, the coder and decoder need not to use the signal 511. In this case, the final code and decode selection is known to the coder 506 and decoder 507. Once the final selection of a set of code and decode are established, the coder 506 codes the base band signals 102–105 with the selected set of code, and the decoder 507 decodes the coded base band signals 512–515 for producing the transformed base band signals 518–521 that are input to the signaling buffer 509.

The signaling buffer 509 passes the transformed base band signals 518–519 to its outputs as the corresponding processed base band signals 202–205. The signaling buffer 509 should make the transformed base band signals suitable for corresponding carrier frequency translation and modulator blocks 206–209 in FIG. 2; and if it requires, this operation includes digital to analog conversion, timing adjustment, and other pertinent adjustment. The outputs of the signaling buffer 509 are the processed base band signal 202–205.

Figure 6:
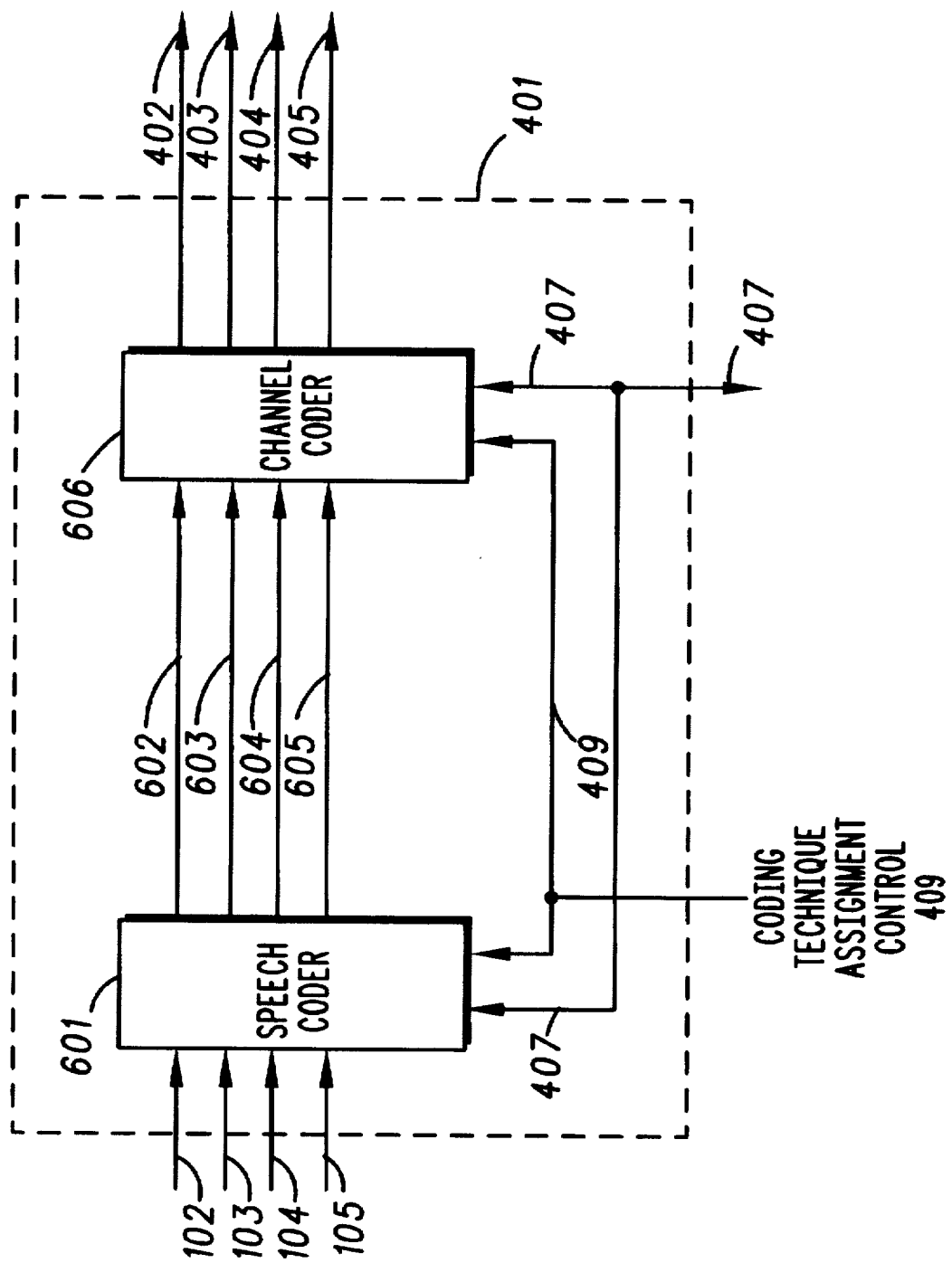
FIG. 6 generally depicts an embodiment of the coder including a speech coder and a channel coder.

FIG. 6 depicts a block diagram of the preferred embodiment of the coder block 401 in FIG. 4 in accordance with the invention. In this embodiment, the coder comprises a speech coder 601, and a channel coder 606, that are connected in series. The information signals 102–105, which in this case are speech signals, are passed through the speech coder 601. The speech coder 601 is of a type that produces several different but related speech codings; such a speech coder is a code excited linear prediction speech coder. The speech coder 601 can code the input speech signals in a variety of ways where each coding provides slight variations in speech quality. As a result, when a speech signal is coded with those slight variations of coding, the coded signals waveforms are significantly different; however, each variety of coded signal have slight variation of speech quality. Therefore, the speech coder 601 codes each speech signals 102–105 with each slight variation of a speech coding for producing speech coded signals 602–605. In essence, each variation of speech coding is viewed as a different coding technique.

The speech coded signals 602–605 are input to channel coder 606. The channel coder 606 codes the input signals according to an assigned channel coding technique, and outputs coded base band signals 402–405. The coding technique assignment control signal 409 is input to speech coder 601 and channel coder 606. The analyzing processor 406 in FIG. 4 signals speech coder 601 for selecting a set of speech coding technique that are used for coding signals 102–105. If the analyzing processor requests a different coding technique than the previous request, the speech coder 601 makes a slight variation in its coding of each signal, and thereby, produces speech coded signals 602–605 that are significantly different than the previously coded signals. This would result eventually in significantly different coded base band signal 402–405. After one or several requests from the analyzing processor for different speech coding technique, a set of coded base band signals 402–405 are produced that would pass the analyzing processor criteria, or criterion.

In another scenario, the analyzing processor keeps the same speech coding technique assignment, and, through signal 409, requests the channel coder 606 to code the speech coded signals 602–605 with different coding technique. In a dynamic scenario, the analyzing processor, through signal 409, requests the speech coder 601 and channel coder 606 for a different coding techniques; which in this case, the speech coding and channel coding are different than the previous selection. Eventually, the analyzing processor selects a speech coding and a channel coding technique. Those pair of coding techniques, when applied in series to signals 102–105, could produce coded base band signals 402 through 405 which satisfy the requirements of the composite signal 216 of FIG. 2. An advantage of this preferred embodiment is that the operations of the channel coding is simplified because the speech coder, through slight variation in speech coding, can produce essentially the same speech signal with distinctly different resulting waveforms. As such, the amount of time spent finding a set of coded base band signals 402-405 that meet the selected criteria is greatly reduced.

The information signal processing block 201 can be implemented by one or more microprocessors or may likewise be implemented from a hybrid of microprocessor and hardware specific systems. In any of the alternative implementations, there is no need to actually perform the coding or other functions for analyzing and selecting processes of block 201.

FIG. 3 generally depicts a block diagram of an embodiment of a composite carrier generator 217 of FIG. 2. The composite carrier signal 216 of FIG. 2 is generated digitally in this embodiment and has all the attributes of a composite carrier signal in accordance with the invention. A digital base band signal processing block 301 analyzes the information signals 102-105 for selecting a suitable set of codes according to the invention. Further, the block 301 codes the information signals 102-105 with the selected set of codes, and transform each coded base band signal to a digital carrier signal. The plurality of digital carrier signal are summed together for producing a digital composite carrier signal 302. The digital base band signal processing block 301 generates the digital composite carrier signal 302 which is a digital representation of the composite carrier 216. The signal 302 is transformed from digital to analog format in a digital to analog converter 303. The output of block 303 is the composite carrier signal 216 in analog format.

This invention is not limited to the number of information signals, or information channels, as were used in describing this invention. This invention may be incorporated, as one ordinary skilled in the art appreciates, in another system, or it may function as a stand alone system.

What we claim is:

1. A communication system for transmitting a composite carrier signal, comprising:

a coder for coding a plurality of information signals according to a coding technique to produce a corresponding plurality of coded baseband signals; and a processor for processing said plurality of coded baseband signals to form a simulated composite carrier signal and for analyzing said simulated composite carrier signal based on peak-to-average amplitude ratio requirements, wherein said simulated composite carrier signal has characteristics of an actual composite carrier signal that would have resulted if said plurality of coded baseband signals had been combined, wherein said processor produces a coding technique assignment control signal to vary and select said coding technique in said coder, wherein said processor repeatedly varies and selects, through said coding technique assignment control signal, coding techniques in said coder until at least one coding technique is identified for producing an acceptable set of said coded baseband signals based on whether the peak-to-average amplitude ratio of said simulated composite carrier signal is within said predetermined limit.

2. The communication system as recited in claim 1, wherein said processor produces a pass indicator based on the analysis of said simulated composite carrier signal which indicates when said simulated composite carrier signal peak-to-average amplitude ratio is within a predetermined limit.

3. The communication system as recited in claim 2, further comprising a transmission buffer for conditioning said plurality of coded baseband signals based on said pass indicator to produce corresponding processed baseband signals.

4. The communication system as recited in claim 3, wherein said processed baseband signals are combined to form an actual composite carrier signal having a peak-to-average amplitude ratio within said predetermined level.

5. The communication system as recited in claim 3, wherein the conditioning includes adding information to said plurality of coded baseband signals to facilitate reconstruction of said information signals in a receiver receiving said actual composite carrier signal.

6. A communication system as recited in claim 1, wherein said processor identifies a plurality of said coding techniques for producing a corresponding plurality of said acceptable sets of said coded baseband signals, and selects one of the identified coding techniques for producing the corresponding said acceptable set of coded baseband signals.

7. The communication system as recited in claim 6, wherein said identified plurality of coding techniques are ranked according to their contributory distortion to said information signals, and said processor selects one of the ranked coding techniques.

8. The communication system as recited in claim 7, wherein said contributory distortion to said information signals is determined based on either equal, unequal weighting factors, no weighting factor, or a combination thereof, given to a set of said information signals.

9. A communication system as recited in claim 1, wherein said coder includes:

a speech coder for speech coding said plurality of information signals according to a speech coding assignment based on said coding technique assignment control signal to produce corresponding plurality of speech coded baseband signals; and a channel coder for coding said plurality of speech coded baseband signals according to a channel coding assignment based on said coding technique assignment control signal to produce said plurality of coded baseband signals.

10. A communication system for transmitting a composite carrier signal, comprising:

a speech coder for coding a plurality of speech signals according to a speech coding assignment to produce a corresponding speech coded baseband signals;

a speech decoder for decoding said speech coded baseband signals according to a speech decoding assignment to produce a corresponding transformed baseband signals; and a processor for processing said plurality of transformed baseband signals to form a simulated composite carrier signal and for analyzing said simulated composite carrier signal based on peak-to-average amplitude ratio requirements, wherein said simulated composite carrier signal has characteristics of an actual composite carrier signal that would have resulted from said plurality of transformed signals, wherein said processor produces a speech coding assignment control signal to vary and select said speech coding assignment in said speech coder and a speech decoding assignment control signal to vary and select said speech decoding assignment in said speech decoder, wherein said processor repeatedly varies and selects, through either said speech coding, or said speech decoding, assignment control signals, different speech coding, or decoding, assignments in said speech coder, or decoder, until at least a speech coding, or decoding, or a pair of coding and decoding, assignments are identified, respectively, for producing an acceptable set of said transformed baseband signals based on whether the peak-to-average amplitude ratio of said simulated composite carrier signal is within said predetermined limit.

11. The communication system as recited in claim 10, wherein said processor produces a pass indicator based on the analysis of said simulated composite carrier signal which indicates when said simulated composite carrier signal peak-to-average amplitude ratio is within a predetermined limit.

12. The communication system as recited in claim 11, further comprising a transmission buffer for conditioning said plurality of transformed baseband signals to produce corresponding processed baseband signals for forming an actual composite carrier signal.

13. The communication system as recited in claim 12, wherein said processor identifies a plurality of either said speech coding, or decoding, or pairs of coding and decoding, assignments for producing corresponding plurality of said acceptable sets of said transformed baseband signals and selects either one of the identified speech coding, or decoding, or pairs of coding and decoding, assignments for producing the corresponding said acceptable set of transformed baseband signals.

14. The communication system as recited in claim 13, wherein said identified plurality of speech coding, or decoding, or pairs of coding and decoding, assignments are ranked according to their contributory distortion to said speech signals and said processor selects one of the ranked speech coding assignments.

15. The communication system as recited in claims 14 wherein said contributory distortion to said information signals is determined based on either equal, unequal weighting factors, no weighting factors, or combination thereof given to a set of said speech signals.

16. A method of analyzing a signal to be transmitted, the method comprising the steps of:

simulating a modulation of a plurality of separate signals with a corresponding plurality of modulation codes to produce a plurality of separate simulated signals;

analyzing the plurality of separate simulated signals based on predetermined criteria related to a peak-to-average ratio of a composite signal comprised of a combination of the separate simulated signals;

varying at least one modulation code when the composite signal comprised of a combination of the separate simulated signals is greater than a predetermined peak-to-average ratio threshold.

17. The method of claim 16, further comprising the step of analyzing the composite signal comprised of a combination of the separate simulated signals based on the predetermined criteria related to a peak-to-average of the composite signal.

18. The method of claim 16, further comprising the steps of:

modulating the plurality of separate signals with the modulation codes to produce a plurality of separate modulated signals, when the composite signal comprised of a combination of the separate simulated signals is less than a predetermined peak-to-average ratio threshold;

combining the separate modulated signals to form an actual composite signal; and transmitting the actual composite signal within a required peak-to-average ratio to a corresponding plurality of mobile stations within the communication system.

* * * * *